US006441933B1

United States Patent
Jang

(10) Patent No.: US 6,441,933 B1
(45) Date of Patent: Aug. 27, 2002

(54) SIGNAL MONITORING APPARATUS FOR WAVELENGTH DIVISION MULTIPLEXED OPTICAL TELECOMMUNICATIONS NETWORKS

(75) Inventor: Jin Hwan Jang, Kunpo-si (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 09/223,930

(22) Filed: Dec. 31, 1998

(30) Foreign Application Priority Data

Jun. 2, 1998 (KR) .......................................... 98-20459

(51) Int. Cl.$^7$ ................................................ H04J 14/02
(52) U.S. Cl. ....................................... 359/124; 359/180
(58) Field of Search ................................ 359/124, 110, 359/180, 187

(56) References Cited

U.S. PATENT DOCUMENTS

| | | | |
|---|---|---|---|
| 5,434,877 A | | 7/1995 | Chung .......................... 372/32 |
| 5,617,234 A | | 4/1997 | Koga et al. .................. 359/131 |
| 5,644,423 A | * | 7/1997 | Iwano ..................... 359/133 X |
| 5,777,763 A | | 7/1998 | Tomlinson, III ............ 359/130 |
| 5,793,909 A | | 8/1998 | Leone et al. .................. 385/24 |
| 5,796,479 A | | 8/1998 | Derickson et al. .......... 356/326 |
| 5,825,792 A | | 10/1998 | Villeneuve et al. ........... 372/32 |

OTHER PUBLICATIONS

Shimosaka, et al., "Frequency Separation Locking and Synchronication for FDM Optical Sources Using Widely Frequency Tunable Laser Diodes,"1990 IEEE, pp. 1078–1086, Aug. 1990.

Chung, Y. C., "Frequency–Locked 1.3– and 1.5–$\mu$m Semiconductor Lasers for Lightwave Systems Applications," 1990 IEEE, pp. 869–876, Jun. 1990.

Boucher, et al., "Calibrated Fabry–Perot Etalon as an Absolute Frequency Reference for OFDM Communications," 1992 IEEE, pp. 801–804, Jul. 1992.

Jiang, et al., "A Frequency Calibration Method for Multilocation Optical FDM Networks," 1993 IEEE, pp. 1253–1256, Oct. 1993.

(List continued on next page.)

Primary Examiner—Thomas Mullen
(74) Attorney, Agent, or Firm—McKenna Long & Aldridge LLP

(57) ABSTRACT

The present invention provides a signal monitoring apparatus for wavelength division multiplexed (WDM) optical telecommunication networks capable of the optical signal telecommunication networks efficiently by maintaining an operating wavelength, in which each of the WDM channels are allocated in a certain way, and an optical power in a constant error range without limiting the number of the WDM channel. It may monitor and revise an error of an operating wavelength of each WDM channel and a repeatability to a wavelength. Accordingly, the present invention provides a signal monitoring apparatus for wavelength division multiplexed (WDM) optical telecommunication networks, including the ability to generate absolute wavelength reference stabilized on an absolute wavelength reference, the ability to generate wavelength reference set having a constant frequency spacing from a wide band optical signal, the ability to receive the absolute wavelength reference or one wavelength reference among the wavelength reference set using tunable filtering methods, or a wavelength division multiplexed (WDM) channel signal which is used in the optical telecommunication networks, and the ability to control for counting a gap between the absolute wavelength reference and the WDM channel signal with a certain frequency value, and controlling the wavelength and the optical power of the WDM channel, in which the absolute wavelength reference passes the tunable filter.

22 Claims, 7 Drawing Sheets

OTHER PUBLICATIONS

Ono, Takashi, "Fiber Grating Wavelength Monitor for Optical Amplifier Control and Administration in WDM Transmission Systems," Technical Digest, Jul. 1996, pp. 118–119.

Gaudino, et al., "WDM Channel Equalization Based on Subcarrier Signal Monitoring," OFC 98 Technical Digest, pp. 167–170.

Yano, et al., "Absolute Wavelength Stabilization of LD Ligrnts for Dense WDM Systems Using a Multi–Wavelength Meter," OECC '97 Technical Digest, Jul. 1997, pp. 414–415, Seoul, Korea.

IEEE Photonics Technology Letters, vol. 5, No. 2, Feb. 1993, pp. 188–189.

* cited by examiner

SIGNAL MONITORING APPARATUS FOR WAVELENGTH DIVISION MULTIPLEXED OPTICAL TELECOMMUNICATIONS NETWORKS

BACKGROUND

1. Technical Field

The present invention relates generally to a signal monitoring apparatus for wavelength division multiplexed (hereinafter, referring to WDM) optical telecommunication networks, particularly to an optical channel error monitoring and detecting apparatus capable of effectively operating optical telecommunication networks by maintaining a wavelength, which is allocated to each certain WDM channel, and an optical power in a constant error range as well as extending number of WDM channels. It is performed by using a reference signal having a wide wavelength tunable range and a repeatability to a wavelength such that the monitoring system may monitor and revise the wavelength of each WDM channel and the optical output error.

2. Background

Recently, there has been considerable interest to increase the optical telecommunication capacity by using an optical fiber. Thereby, the WDM is introduced among methods capable of handling multichannel optical signals in an optical fiber. And also there is a great amount of study towards minimizing and revising the problems which affect the adjacent channels according to the errors of the channel wavelength and the optical power.

There are a lot of studies to control each WDM channel wavelength. Recently, research into the prevention of crosstalk by maintaining all channels to have the same optical power has begun by measuring each WDM channel optical output.

Figure 1:
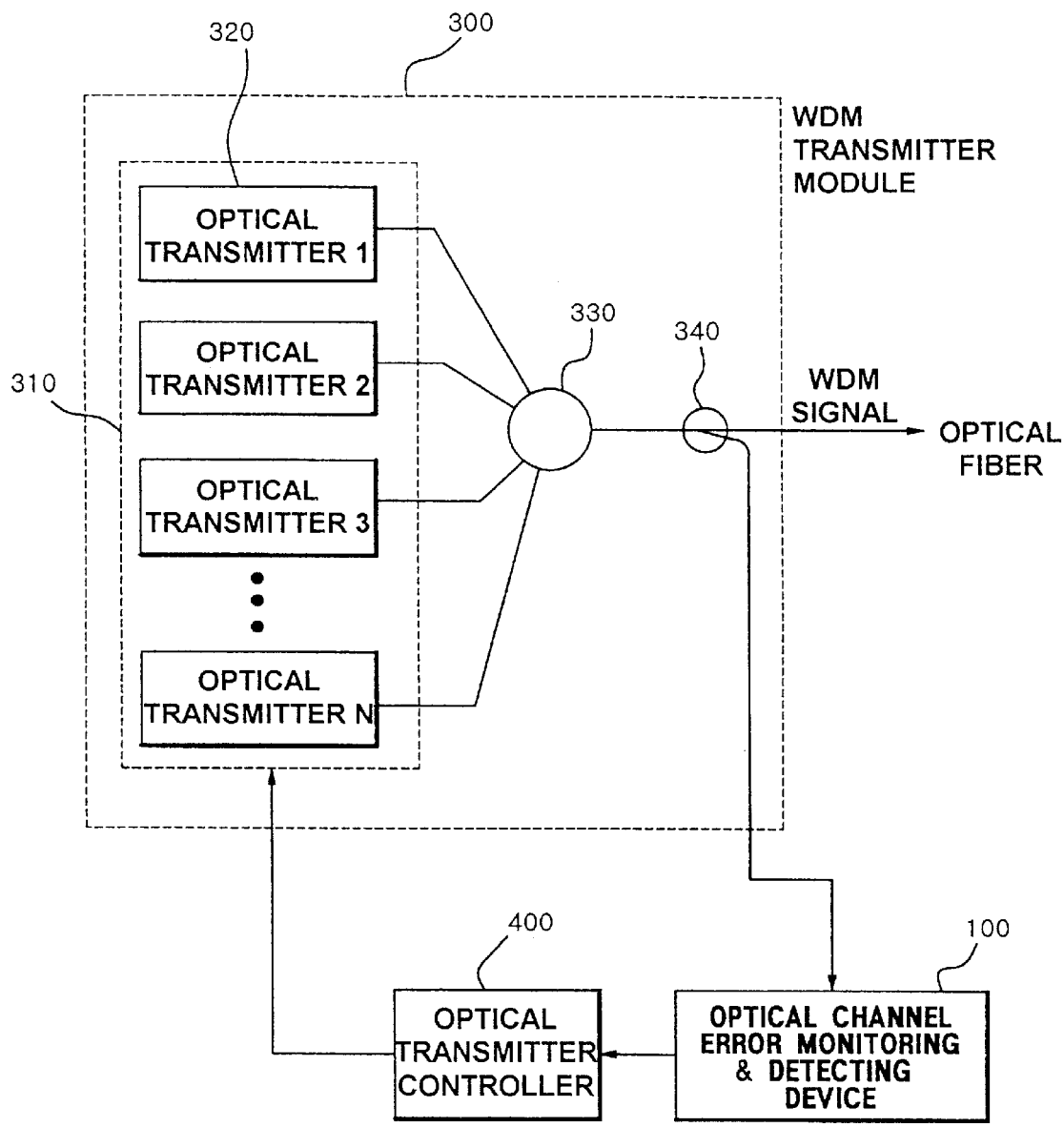

FIG. 1 shows a schematic diagram of a general WDM optical transmission terminal which comprises a WDM transmitter module 300, an optical channel error monitoring and detecting device 100, and an optical transmitter controller 400. A WDM optical transmitter 310 is a transmitting module which is comprised of a plurality of optical transmitters 320 having optical wavelengths which are different from each other. Here, each optical transmitter 320 is a laser generator for converting an electrical signal to an optical signal of a specified optical wavelength. And an optical combiner 330 is a directional coupler for transmitting the wavelength multiplexed optical signal to a single optical fiber after the wavelength multiplexed optical output of each optical transmitter 320. An optical divider 340 divides the optical output of the optical combiner 330 by a constant rate. One of the divided optical outputs is used for a WDM optical telecommunication. The other optical output is connected to the optical channel error monitoring and detecting device 100 and used for an optical channel error monitoring and detecting. The optical channel error monitoring and detecting device 100 transmits monitoring information of the optical channel to the optical transmitter controller 400. The optical transmitter controller 400 controls each optical transmitter 320 and revises the error by using the monitoring information.

Figure 2:
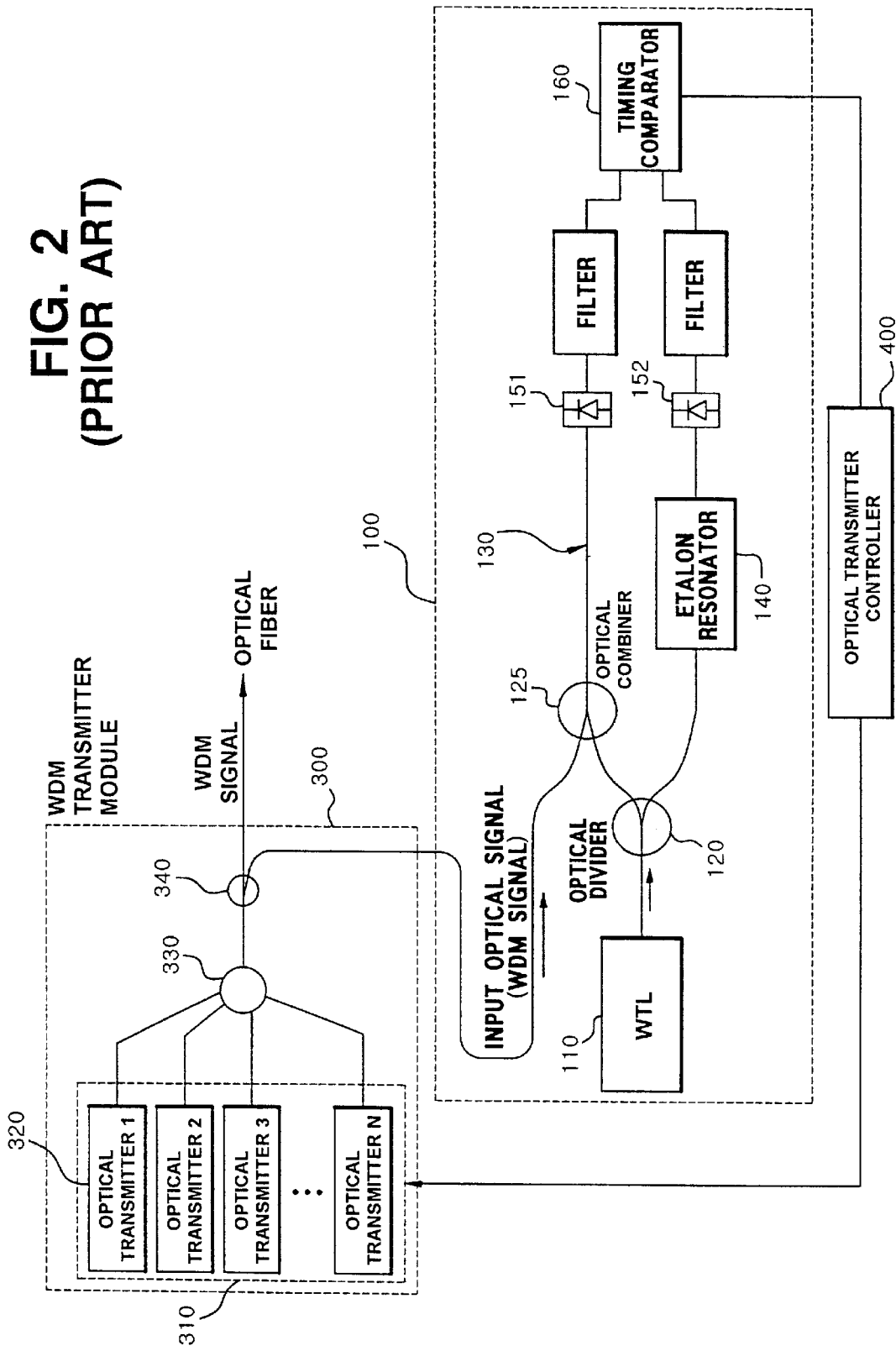
Figure 3:
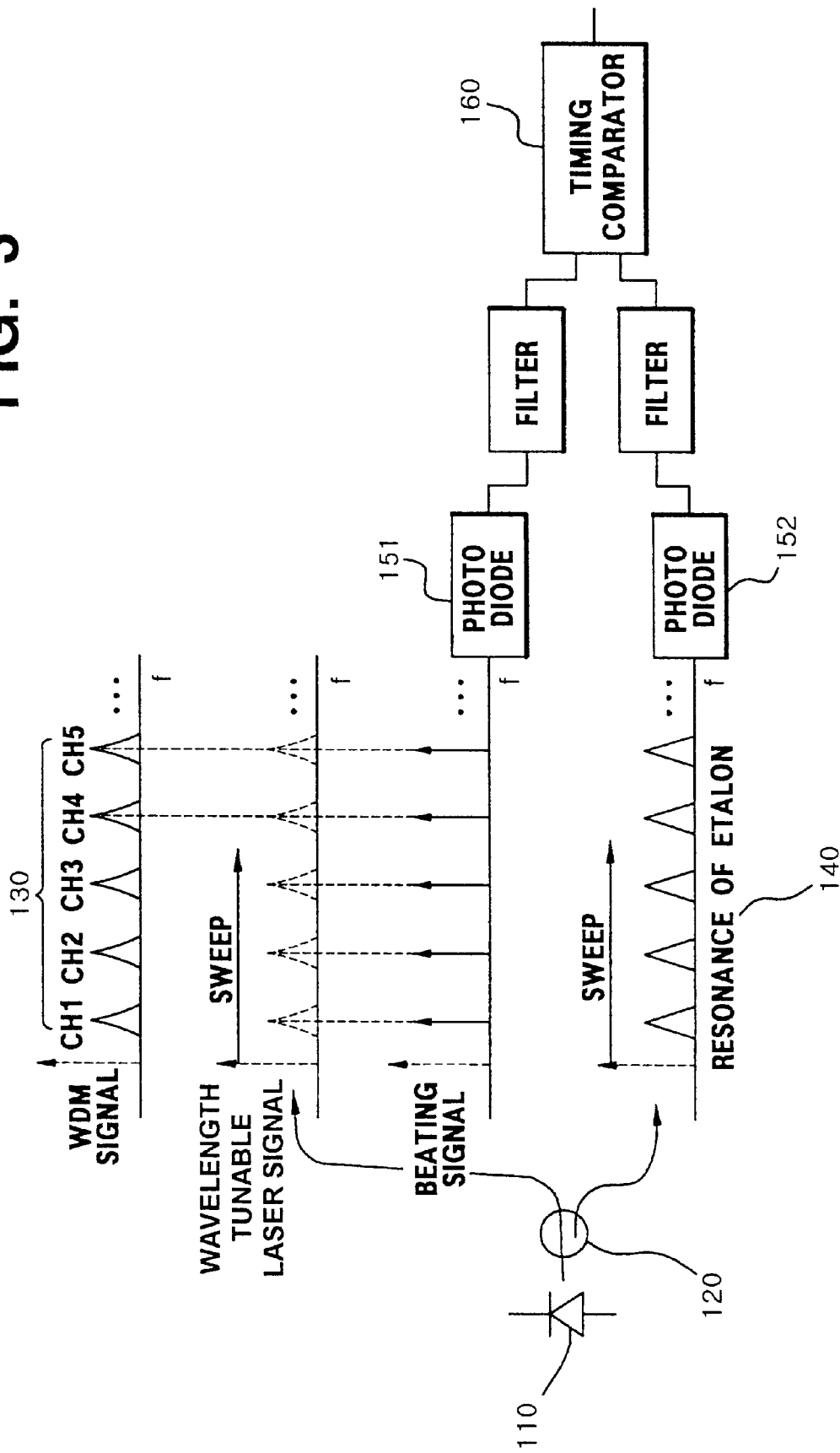

FIG. 2 shows a schematic diagram explaining conventional optical channel error monitoring and detecting of a WDM system. And FIG. 3 shows an illustration for understanding an optical channel wavelength detection according to the prior art, in which FIG. 3 relates to the optical channel wavelength detection by using a wavelength tunable laser (hereinafter, referring to WTL) 110 and an optical resonator (filter).

Now the prior art will be explained with reference to FIG. 2, and FIG. 3.

The wavelength tunable laser (WTL) 110 is a laser generator for converting an electric signal to an optical signal of a certain optical wavelength. And the optical wavelength is controlled by an electric signal. An optical divider 120 divides the optical signal generated from the WTL 110 and outputs the divided optical signal with a same rate (1:1) to a pair of outputs. An optical combiner 125 couples the optical signal of each WDM channel and the divided signal from the WTL 110. The optical fiber 130 shows a transmitting state of the multiplexed WDM optical signal. And an etalon resonator 140 is an optical filter of the resonator type. The etalon resonator 140 passes the optical signal of the WTL 110 whenever the optical wavelength of the WTL 110 matches a resonant frequency.

A photodiode 151 detects a beating signal between the optical signal of the WTL 110 and each WDM channel. And the other optical receiver 152 detects an optical signal of the WTL 110, when the optical wavelength of the WTL 110 matches to the resonant frequency. A timing comparator 160 detects and compares an arrival time between the detected optical signals from each optical receivers 151, 152. And it is ideal that signal detecting time of two optical receivers 151, 152 are same.

Now it will be explained about the operation of the prior art which uses the WTL 110 and the etalon resonator 140 for controlling the WDM channel wavelength described above, at the same time.

The resonant frequency of the etalon resonator 140 is a standard frequency of each WDM channel signal, in which the optical transmitter for each WDM channel should be transmitted during a stable state.

The optical signal generated from the WTL 110, is separated into a pair of signals having the same power in the optical divider 120. One signal of the pair of signals is coupled with each WDM channel signal in the optical fiber 130. And the other signal is passed through the etalon resonator 140 and generates a standard frequency of the WDM channel, in which each WDM channel optical transmitter is operated in the stable state.

Here, an optical signal of WTL 110 which is passed through the optical divider 120 and inputted to the optical fiber 130, is coupled with the optical signal of each WDM channel. Accordingly, an optical receiver 151 detects a beating signal when the optical wavelength of each WDM channel signal and the optical wavelength of the WTL 110 are same. And the optical receiver 151 measures frequencies of each WDM channel by using the detected beating signal.

Additionally, the optical signal of the WTL 110 which has passed through the optical divider 120 and applied to the etalon resonator 140, detects the standard frequency in the optical receiver 152, by passing the optical signal only whose wavelength is the same as resonant wavelength of the etalon resonator 140 (the resonant wavelength of the etalon resonator 140 is the standard frequency of each WDM channel). Here, the resonant wavelength of etalon resonator 140 is synchronized with the standard frequency of each WDM channel, precisely.

The detecting time from the optical receiver 151 is compared with the detecting time from the optical receiver 152. And thereby, it is possible to detect an error of the optical wavelength of each WDM channel signal.

The WTL 110 sweeps the wavelength region of WDM channel at a constant cycle, and thereby detects the error.

It is ideal that a signal detecting time of the optical channel detected from the respective optical receivers 151, 152, is the same compared to the timings comparator 160.

For example, a detecting time of the certain optical channel among the WDM channels detected from the optical receiver 151 exists slower or faster than the detecting time of the corresponding reference optical signal of the optical receiver 152, when an optical wavelength of the optical channel has longer or shorter wavelength than the standard frequency which is resonated from the etalon resonator 140.

Accordingly, it is possible to revise/complement an error signal of the time difference measured from the timing comparator 160, by controlling an optical transmitter driving unit for each WDM channel.

The conventional error monitoring and detecting technology of the optical telecommunication system, using the WTL 110, has problems which limit channel number of the WDM optical telecommunication system according to a wavelength tunable range of the WTL 110.

For example, in case that the channel spacing is 200 GHz, and the channel number is 16, a current wavelength tunable range is considerably limited even though the wavelength tunable laser (WTL) 110 should vary the optical wavelength of 3200 GHz.

Additionally, there is no way to confirm a stability because a mode hopping may be generated in the WTL 110 which is not used commonly. So it affects an efficiency of the system in case of monitoring and controlling the optical wavelength of the WDM optical telecommunication system.

SUMMARY

Accordingly, in order to solve the problems in the prior art, the present invention provides a signal monitoring apparatus for wavelength division multiplexed (WDM) optical telecommunication networks capable of efficiently maintaining an operating wavelength, in which each WDM channels are allocated in a certain way, and an optical power in a constant error range without limiting the number of the WDM channel. It may monitor and revise an error of an operating wavelength of each WDM channel and of the optical output by using a reference signal which has a wide wavelength tunable range and a repeatability to a wavelength.

One embodiment to achieve the object in accordance with the present invention is to provide a signal monitoring apparatus for wavelength division multiplexed (WDM) optical telecommunication networks, comprising absolute wavelength reference generating means for generating an absolute wavelength reference stabilized on an absolute wavelength reference, wavelength reference generating means for generating a wavelength reference set having a constant frequency spacing from a wide band optical signal, tunable filtering means for receiving the absolute wavelength reference or one wavelength reference among the wavelength reference set of the constant frequency spacing, or a wavelength division multiplexed (WDM) channel signal which is used in the optical telecommunication networks, and control means for counting a gap between the absolute wavelength reference and the WDM channel signal a certain frequency value, measuring the optical power of the WDM channel and controlling the wavelength and the optical power of the WDM channel, in which the absolute wavelength reference passes the tunable filter means.

Another embodiment to achieve the object in accordance with the present invention is to provide a signal monitoring apparatus for WDM optical telecommunication networks. Wherein the wavelength reference generating means further comprises an isolator for preventing an external optical signal from inputting to the wide band signal generating means.

The other embodiment to achieve the object in accordance with the present invention is to provide a signal monitoring apparatus for WDM optical telecommunication networks, further comprising at least one optical receiving means for detecting optical signals which pass the tunable filtering means and converting the detected optical signals to an electric signal, wavelength reference generating means of generating a wavelength reference set having the constant frequency spacing, and the tunable filtering means respectively, and at least one optical dividing coupler means for connecting the absolute wavelength reference generating means.

BRIEF DESCRIPTION

Figure 4:
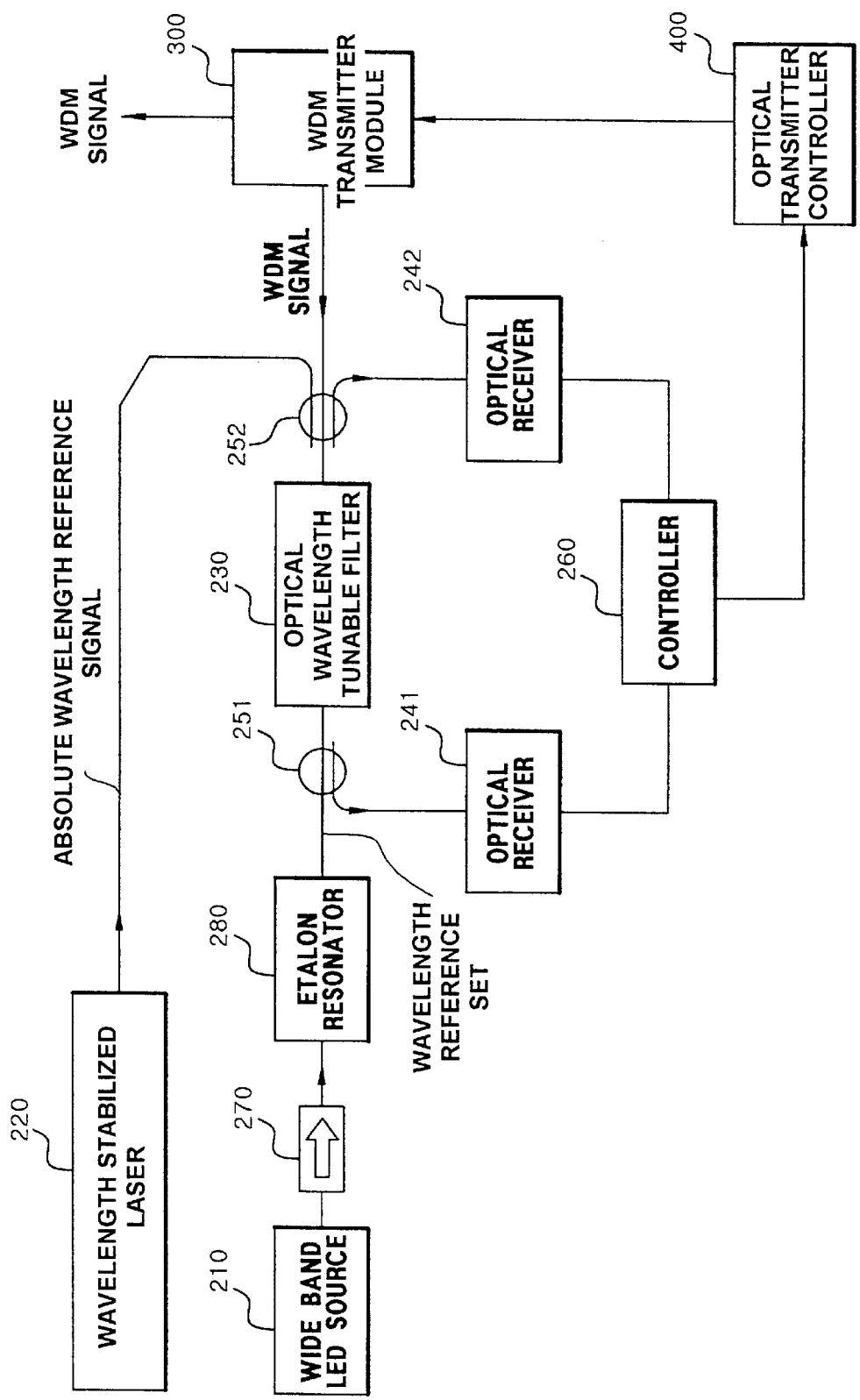
Figure 5:
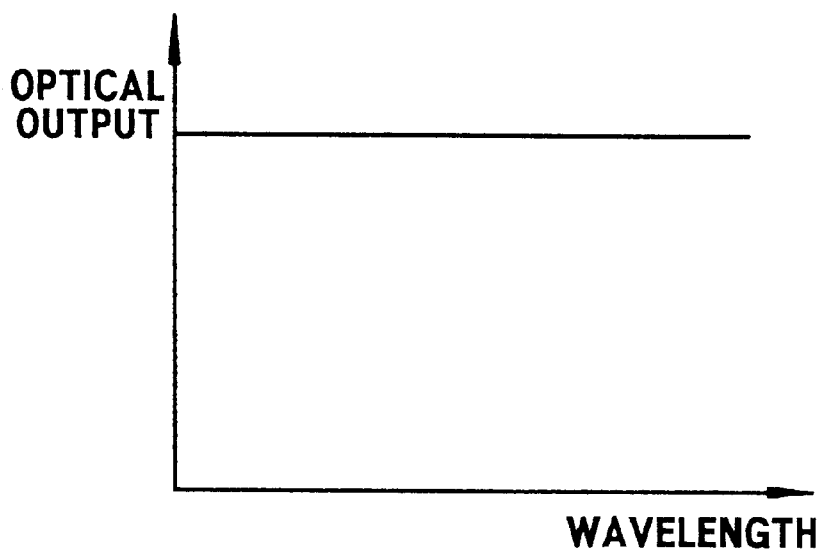
Figure 6:
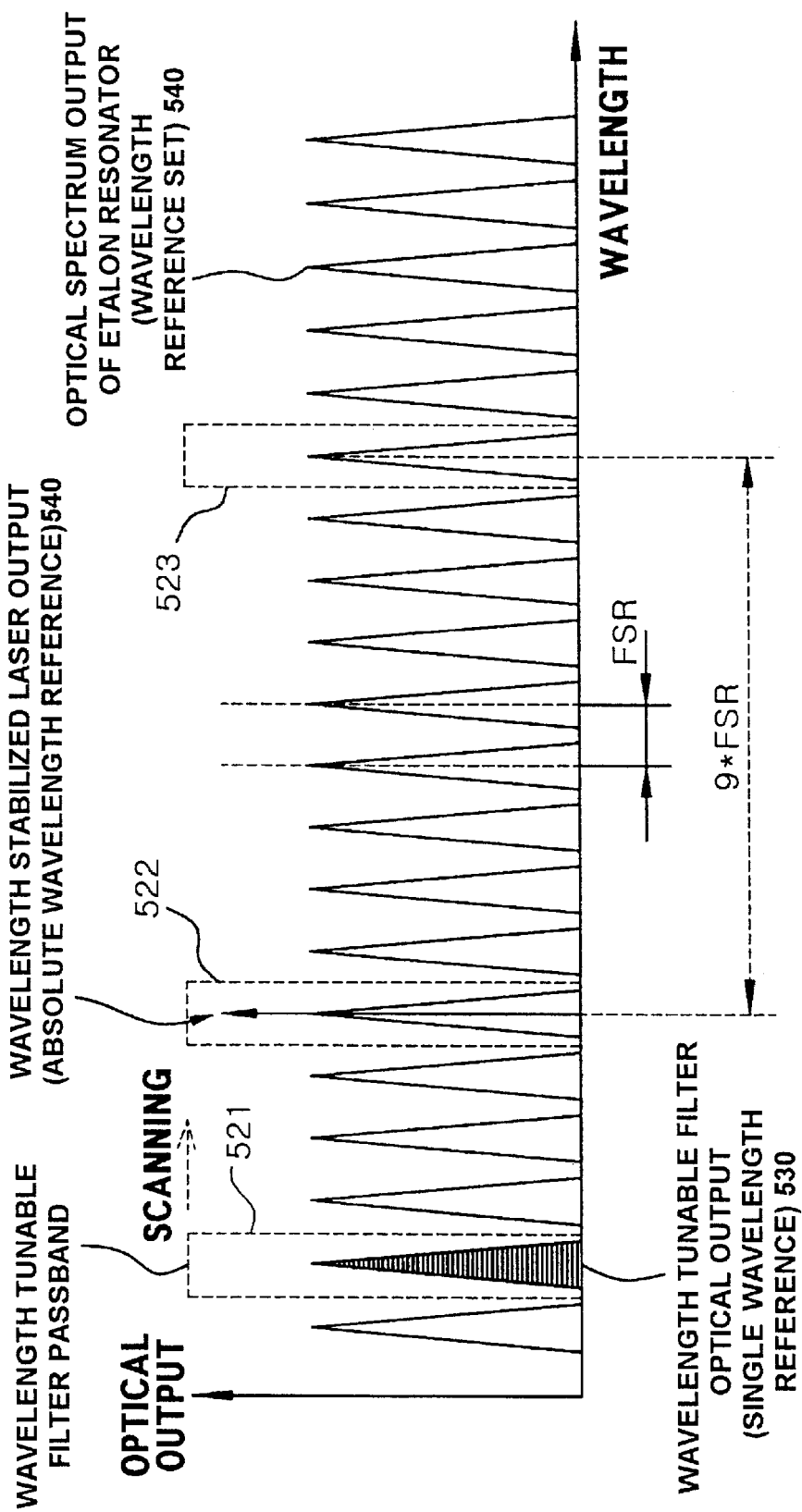
Figure 7:
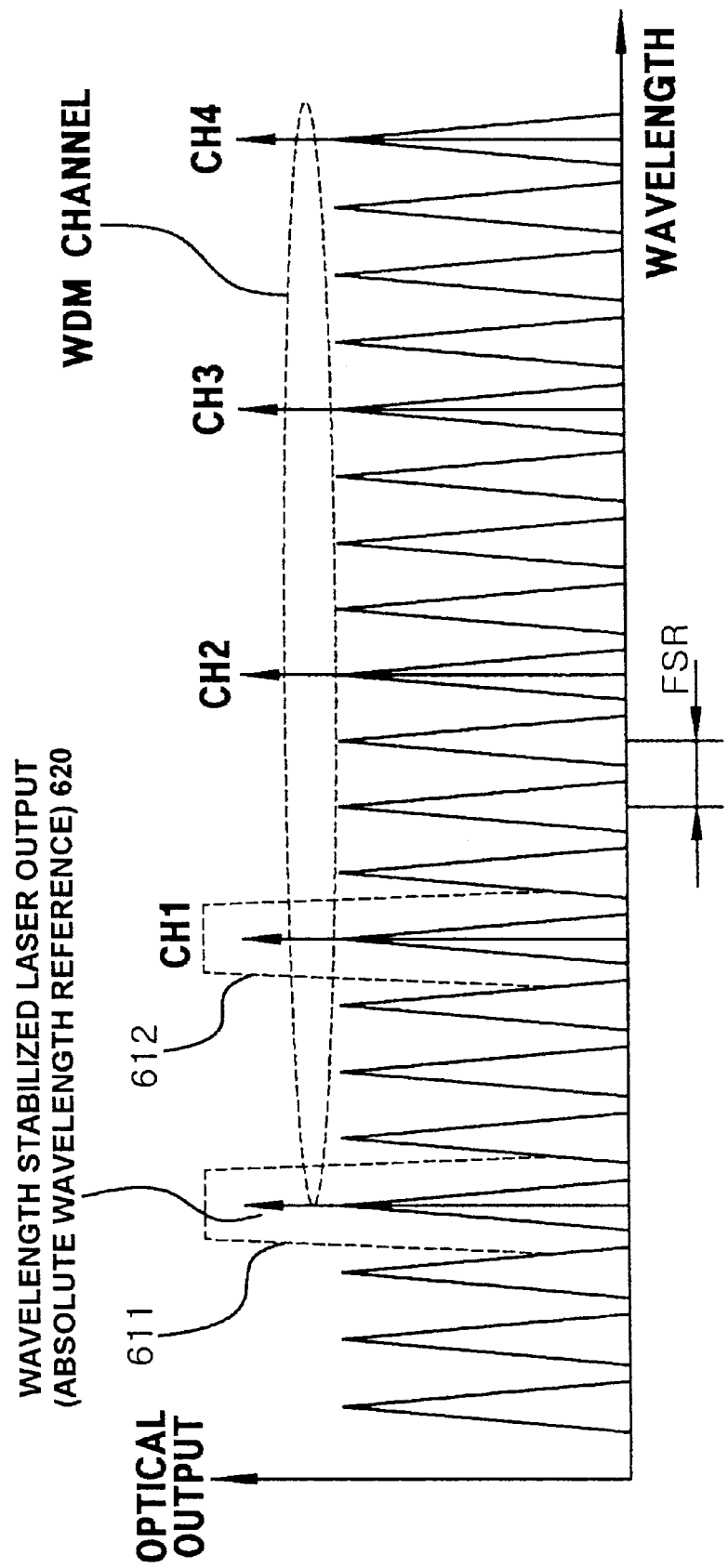

Other objects, features and advantages of the present invention will become more apparent from the following detailed description when read in conjunction with the accompanying drawings, in which:

FIG. 1 is a schematic block diagram of the WDM optical telecommunication terminal, FIG. 2 is a schematic diagram of the conventional optical channel error monitoring and detecting device of the WDM system, FIG. 3 is an optical characteristic diagram explaining for each part frequency detecting operation of FIG. 2, FIG. 4 is a block diagram indicating a configuration about the signal monitoring system for the WDM optical telecommunication networks in accordance with an embodiment of the present invention, FIG. 5 is an optical output characteristic diagram about a wavelength of a wide band optical source in accordance with the present invention, FIG. 6 is an optical output characteristic diagram about a wavelength of the etalon resonator and the optical wavelength tunable filter, and FIG. 7 is an optical output characteristic diagram about the WDM channel wavelength.

DETAILED DESCRIPTION OF THE PREFERRED EMBODIMENTS

Referring to FIGS. 4 to 7, the signal monitoring system for WDM optical telecommunication networks according to each embodiment of the present invention will be explained in detail.

FIG. 4 shows a block diagram indicating a configuration about the signal monitoring system for the WDM optical telecommunication networks in accordance with an embodiment of the present invention.

It comprises absolute wavelength reference generating means for generating an optical output of a laser stabilized on an absolute reference wavelength, wavelength reference generating means for generating a wavelength reference set having a constant frequency spacing from a wide band optical signal, tunable filtering means for receiving the absolute reference wavelength or the wavelength reference set of the constant frequency spacing, or a wavelength division multiplexed (WDM) channel signal which is used in the optical telecommunication networks, control means for counting a gap between the wavelength reference and the WDM channel signal with the certain frequency value and control wavelength and optical power of WDM channel, in which the wavelength reference passes the tunable filter means, at least one optical receiving means for converting optical signals which passes the tunable filter means into an electric signal, and at least one optical directional coupler means for connecting the absolute wavelength reference generating means and the wavelength reference generating means of generating a wavelength reference set having the constant frequency spacing and the tunable filtering means, respectively.

Referring to FIG. 4, the present invention comprises a wide band LED source 210 for supplying an even optical power from the wide band wavelength range, a wavelength stabilized laser 220 outputting an optical signal having an absolute reference wavelength stabilized in an absorption line of an atom or a molecule, such as krypton or acetylene, etc., an etalon resonator (filter) 280 having a transmission characteristic which passes an optical signal (optical signal of the wide band LED), in which a wavelength of the optical signal is the same as the resonant frequency, having a constant frequency spacing, an optical wavelength tunable filter 230 for passing an optical signal only in a certain optical wavelength range according to the transmission characteristic which is changing by an electric control signal, a pair of optical receivers 241, 242 for detecting an optical signal which passes the optical wavelength tunable filter 230 and converting the optical signal to an electric signal, a plurality of optical directional couplers 251, 252 for dividing an optical signal inputted through one or two optical fibers, into 2 or 3 optical signals and then sending the optical signals to each optical fibers or coupling the one or two optical fibers connect the etalon resonator 280 and the optical wavelength tunable filter 230, or the wavelength stabilized laser 220 and the optical wavelength tunable filter 230, or the WDM channel signal and the optical wavelength tunable filter 230, respectively, a controller 260 for generating a signal for analyzing and monitoring the signal detected from the pair of optical receivers 241, 242 as each optical wavelength and an optical power of each WDM channel, and an optical isolator 270 for preventing an external optical signal to be inputted to the wideband LED source 210. And the optical wavelength of the wavelength stabilized laser 220, has lower wavelength than the lowest wavelength of a WDM channel, in which the WDM channel is used in the optical telecommunication system. Therefore, it is possible to scan from the channel of the lowest wavelength of the WDM channel. In other words, referring to FIG. 7, a reference point is always to the left of a channel 1(CH1) and then it is possible to scan all of WDM channels when the optical wavelength of the wavelength stabilized laser 220 has lower wavelength than the WDM CH1. Unexplained number 300 is a WDM transmitter module for WDM system and 400 is an optical transmitter controller.

A resonant frequency $f_k$ of the etalon resonator is:

$$f_k = K^* FSR \qquad \text{formula 1}$$

FSR: Free Spectral Range, K: a natural number

FIG. 6 is a characteristic diagram of the etalon resonator and the optical wavelength tunable filter. And FIG. 7 shows a diagram showing the wavelength and the optical output of the WDM channel. And now it will be in detail explained an operation and effect in accordance with the present invention.

The present invention uses the character of the resonant frequency of the etalon resonator 280 and the optical wavelength tunable filter 230. Thereby it is possible to make an optical spectrum (wavelength reference) having a same wavelength of the standard frequency of the WDM channel and detect each WDM channel by scanning the WDM signal of the optical telecommunication network. And by using the resonant frequency of the etalon resonator 280, an exact wavelength and an optical output of each WDM channel are detected by overcoming an irregularity of the optical wavelength tunable filter 230.

When an optical output having a character which is even and stable in the wide band wavelength range is generated from the wide band LED source 210 shown in FIG. 4, the optical output is separated from an external optical signal and thereby eliminates crosstalk generated between the optical output and the external optical signal. And the optical output is applied to the etalon resonator 280 through an isolator 270. The etalon resonator 280 transmits the optical signal (the optical signal of the wide band LED) which is the same as the resonant frequency having a constant frequency spacing. Accordingly, an optical spectrum 510 of the optical signal (referring to FIG. 4) which passes the etalon resonator 280, is shown as the solid line in FIG. 6. Here a peak of the optical spectrum 510 is a resonant frequency and a spacing of the resonant frequency is determined according to the internal design structure of the etalon resonator 280 explained in formula 1.

The passband 521 of the optical wavelength tunable filter 230 is indicated in FIG. 6. And the passband 521 is designed to be controlled constantly according to an external electric signal. However, it is difficult to maintain a constant character in accordance with usage for long time or an environment change. Accordingly, there is problem that the character of wavelength tunable filter 230 may be not repeated even though the external electric control signal is applied constantly.

Accordingly, the optical signal 510 from the etalon resonator 280 is inputted to the optical wavelength tunable filter 230 in order to resolve the irregularity of the optical wavelength tunable filter 230 by using the resonant mode of the etalon resonator 280. Thereby, an optical output 530 (referring to FIG. 6) having the same type of an etalon resonant output 510 which follows the resonant frequency of the etalon resonator 280, may be acquired in the output of the optical wavelength tunable filter 230. In other words, the optical output 530 of the optical wavelength tunable filter 230 (referring to FIG. 4) has one resonant frequency optical signal.

An optical signal (referring to FIG. 4) which passes (from left to right in the figure) the optical wavelength tunable filter 230, is detected as an electric signal in the optical receiver 242 through the optical directional coupler 252. Here, the optical receiver 242 applies a pulse to the controller 260 whenever a pass wavelength of the optical wavelength tunable filter 230 is matched to the resonant frequency of the etalon resonator 280, in case that the optical wavelength tunable filter 230 scans towards a long wavelength direction in FIG. 6.

Besides, an output of the wavelength stabilized laser 220 passing the optical directional coupler 252, is applied to the optical wavelength tunable filter 230. An optical signal from the etalon resonator 280 which has passed (from the right to left in FIG. 4) the optical wavelength tunable filter 230, is detected in the optical receiver 241 after passing the optical directional coupler 251. The optical receiver 241 applies the detected signal to the controller 260. Here, the optical signal from the etalon resonator 280 is not transmitted to the optical receiver 241 because of a directive optical directional coupler 251. And an output 540 of the wavelength stabilized laser 220 passes through the optical wavelength tunable filter 230 and is detected by the optical receiver 241 when a passband of the optical wavelength tunable filter 230 arrives at a second location 522 in FIG. 6. And the output 540 is used for a reference signal for counting a pulse of the optical receiver 242. The optical receiver 241 does not detect the output 540 of the wavelength stabilized laser 220 as a reference signal for counting, in case that the pass wavelength band of the optical wavelength tunable filter 230 is not in the second location 522.

Accordingly, the controller 260 counts the pulse which is detected from the optical receiver 242 and calculates the frequency by using the number of the counted pulse and the optical output 540 of the wavelength stabilized laser 220. Here the optical output 540 is a reference pulse which confirms the location change of the optical wavelength tunable filter 230. Consequently, it may help to confirm how much the optical wavelength tunable filter 230 moves from an original location.

For example, it is assumed that the passband of the optical wavelength tunable filter 230 moves from the second location 522 to a third location 523, shown in FIG. 6. The controller 260 counts 9 pulse signals on the basis of the output 540 which the wavelength stabilized laser 220 generates. And the passband of the optical wavelength tunable filter 230 is 9 times the FSR from a central wavelength of the wavelength stabilized laser 220. Accordingly, a moving location of the optical wavelength tunable filter 230 is established at "central wavelength of the wavelength stabilized laser+(9 * FSR)" by using the formula 1.

Accordingly, a pulse according to the optical output of the wavelength stabilized laser 220 is used as a reference pulse of the resonant frequency count of the etalon resonator 280 and used as a reference signal for determining a passband location change of the optical wavelength tunable filter 230. And it is possible to acquire a result capable of filling a capacity, by using the etalon resonator 280 to resolve the irregularity of the optical wavelength tunable filter 230.

Additionally, it will be explained the procedure for detecting each WDM channel wavelength and the optical output by using a system having 4 WDM channels, referring to FIG. 7. When the WDM signal (referring to FIG. 4) from the WDM transmitter module 300 for WDM system, is inputted, the WDM signal is detected according to the optical receiver 241 through the optical directional coupler 252, the optical wavelength tunable filter 230, and another optical directional coupler 251. The optical wavelength tunable filter 230 detects an output 620 of the wavelength stabilized laser 220 by moving to the first location 611 and then scans the output 620 to the long wavelength direction. Here, 3 pulses are detected by the optical receiver 242 and the optical receiver 241 detects an optical signal of the WDM channel 1 and measures the optical signal power when a 4th pulse signal is detected. Accordingly, because the optical receiver 242 receives the 4 pulses, the wavelength of the WDM channel 1 is "wavelength of the wavelength stabilized laser+(4 * FSR)". Additionally, optical output and optical wavelength of each channel may be measured through the above procedure about other WDM channel.

After detecting the character of overall WDM channels described above, the location of the output 620 of the wavelength stabilization laser 220 is reconfirmed by scanning towards a short wavelength which is a location of the output 620 of the wavelength stabilized laser 220. And then the above procedures are repeatedly performed. Here, the above monitoring apparatus is capable of improving the accuracy of each WDM channel wavelength in case of making the FSR of the etalon resonator 280 and the passband of the optical wavelength tunable filter 230 narrowed sufficiently.

Advantages according to the present invention provide the capability of monitoring all WDM channels used in the optical telecommunication system by monitoring and detecting the channel error of the WDM optical telecommunication system in accordance with the wide band source, the wavelength tunable filter, and the etalon resonator. It is possible to eliminate a crosstalk therebetween and improve an accuracy of the optical wavelength and of the optical output measurement by maintaining the incident direction of the WDM channel signal and the wide band LED source opposite one another using the bi-directional filtering characteristics of the optical wavelength tunable filter. Additionally it is possible to measure the optical wavelength and the optical power at the same time by using the optical wavelength tunable filter and the pair of optical receivers. The present invention is not limited to the specifically disclosed embodiments, and variations and modifications may be made without departing from the scope of the present invention.

What is claimed is:

1. A signal monitoring apparatus for wavelength division multiplexed (WDM) optical telecommunication networks, comprising:

absolute wavelength reference generating means for generating an optical output of a laser stabilized on an absolute wavelength reference, wavelength reference generating means for generating a wavelength reference set having a constant frequency spacing from a wide band optical signal defining a wavelength range, tunable filtering means for receiving the optical output of the laser or one wavelength reference among the wavelength reference set of the constant frequency spacing, or a WDM channel signal which is used in optical telecommunication networks, and control means for counting a gap between the optical output of the laser and the WDM channel signal with a certain frequency value, measuring the optical power of the WDM channel and controlling the wavelength and the optical power of the WDM channel, in which the optical output of the laser passes the tunable filter means.

2. The signal monitoring apparatus for WDM optical telecommunication networks according to claim 1, wherein the absolute wavelength reference is stabilized on an absorption line comprising one of an atom or a molecule, wherein the atom or molecule includes one of krypton and acetylene.

3. The signal monitoring apparatus for WDM optical telecommunication networks according to claim 1, wherein the optical output of the laser is applied to the control means after passing through the tunable filtering means, in which the tunable filtering means passes an optical spectrum of a predetermined frequency value, in which the predetermined frequency value is the same as a standard frequency of the WDM channel.

4. The signal monitoring apparatus for WDM optical telecommunication networks according to claim 1, wherein the wavelength reference generating means comprises:

wide band signal generating means for generating the wide band optical signal, and filtering means for transmitting portions of the wide band optical signal, wherein the transmitted wide band optical signal represents the wavelength reference set.

5. The signal monitoring apparatus for WDM optical telecommunication networks according to claim 4, wherein the wide band signal generating means is a wide band LED for supplying an even optical power in the wavelength range.

6. The signal monitoring apparatus for WDM optical telecommunication networks according to claim 4, wherein the filtering means is an etalon resonnator.

7. The signal monitoring apparatus for WDM optical telecommunication networks according to claim 4, wherein the constant resonant frequency spacing is determined according to an internal design of the filtering means.

8. The signal monitoring apparatus for WDM optical telecommunication networks according to claim 4, wherein the wavelength reference generating means further comprises an isolator for preventing an external optical signal from inputting to the wide band signal generating means.

9. The signal monitoring apparatus for WDM optical telecommunication networks according to claim 1, wherein the tunable filtering means is an optical wavelength tunable filter.

10. The signal monitoring apparatus for WDM optical telecommunication networks according to claim 1, wherein the tunable filtering means is a bi-directional filter for eliminating crosstalk between transmission signals, in which a first incident signal is the WDM channel signal or an optical output of the laser and a second incident signal is the wavelength reference set having a constant frequency spacing.

11. The signal monitoring apparatus for WDM optical telecommunication networks, according to claim 1, wherein the optical output of the laser has a wavelength lower than a lowest wavelength of a WDM channel, in which the WDM channel is used in optical telecommunication networks.

12. The signal monitoring apparatus for WDM optical telecommunication networks according to claim 1, wherein the control means uses a portion of the wavelength references within the wavelength reference set to count the gap between the optical output of the laser and the WDM channel, in which the optical output of the laser is used as a count reference signal for confirming a location of the WDM channel signal within the wavelength range.

13. The signal monitoring apparatus for WDM optical telecommunication networks according to claim 1, wherein the control means uses a portion of the wavelength references within the wavelength reference set to count the gap between the optical output of the laser and the WDM channel, in which the optical output of the laser is used as a reference pulse for confirming a passband location change of the tunable filtering means within the wavelength range.

14. The signal monitoring apparatus for WDM optical telecommunication networks according to claim 1, further comprising at least one optical receiving means for detecting optical signals which pass the tunable filtering means and converting the detected optical signals to an electric signal.

15. The signal monitoring apparatus for WDM optical telecommunication networks according to claim 14, wherein the optical receiving means comprises:
  first optical receiving means for converting the optical output of the laser which passes the tunable filter means or the WDM channel signal to an electric signal, and
  second optical receiving means for converting the wavelength reference set with a constant frequency spacing which passes the tunable filter means, to an electrical signal.

16. The signal monitoring apparatus for WDM optical telecommunication networks according to claim 1, further comprising at least one optical directional coupler means for connecting the absolute wavelength reference generating means, the wavelength reference generating means of generating the wavelength reference set having the constant frequency spacing, and the tunable filtering means, respectively.

17. The signal monitoring apparatus for WDM optical telecommunication networks according to claim 16, wherein the optical directional coupler means comprises:
  a first optical directional coupler for applying the optical signal to the tunable filter means, in which the optical signal is applied from the wavelength reference generating means which generates a wavelength reference set having the constant frequency spacing, and for applying the optical output of the laser or the WDM channel signal which is applied from the tunable filter means, to a first optical receiving means, and
  a second optical directional coupler for applying the optical signal to the tunable filter means, in which the optical signal is applied from the absolute wavelength reference generating means or the WDM channel signal, and for applying the wavelength reference set which passes the tunable filter means, to a second optical receiving means.

18. The signal monitoring apparatus for WDM optical telecommunication networks according to claim 1, wherein the wavelength reference generating means comprises:
  wide band signal generating means for generating the wide band optical signal, wherein the wide band optical signal further comprises a wide band optical output having an even and stable character over the wavelength range, and
  filtering means, having a resonant frequency, for transmitting portions of the wide band optical signal corresponding to the resonant frequency, wherein the transmitted wide band optical signal represents the wavelength reference set.

19. The signal monitoring apparatus for WDM optical telecommunication networks according to claim 18, wherein the wide band signal generating means is a wide band LED for supplying an even optical power in the wavelength range.

20. The signal monitoring apparatus for WDM optical telecommunication networks according to claim 18, wherein the filtering means is an etalon resonator.

21. The signal monitoring apparatus for WDM optical telecommunication networks according to claim 18, wherein the constant frequency spacing is determined according to an internal design of the filtering means.

22. The signal monitoring apparatus for WDM optical telecommunication networks according to claim 18, wherein the wavelength reference generating means further comprises an isolator for preventing an external optical signal from inputting to the wide band signal generating means.

* * * * *